United States Patent [19]
Odell et al.

[11] Patent Number: 5,552,502
[45] Date of Patent: Sep. 3, 1996

[54] POLYMERIZATION PROCESS AND COMPOSITIONS THEREOF

[75] Inventors: Peter G. Odell; Gordon K. Hamer, both of Mississauga, Canada

[73] Assignee: Xerox Corporation, Stamford, Conn.

[21] Appl. No.: 558,996

[22] Filed: Nov. 16, 1995

[51] Int. Cl.⁶ ........................................................ C08F 2/00
[52] U.S. Cl. ................................... 526/234; 526/941
[58] Field of Search ........................ 526/234, 941

[56] References Cited

U.S. PATENT DOCUMENTS

| | | | |
|---|---|---|---|
| 3,090,761 | 5/1963 | Backlund et al. | 526/234 |
| 3,213,069 | 10/1965 | Rausch | 526/234 |
| 3,857,816 | 12/1974 | Tamaguchi et al. | 526/89 |
| 4,581,429 | 4/1986 | Solomon et al. | 526/220 |
| 5,059,657 | 10/1991 | Druliner et al. | 525/244 |
| 5,312,871 | 5/1994 | Mardarc et al. | 525/272 |
| 5,322,912 | 6/1994 | Georges et al. | 526/204 |
| 5,399,644 | 3/1995 | Wozny et al. | 526/234 |
| 5,401,804 | 3/1995 | Georges et al. | 525/267 |
| 5,412,047 | 5/1995 | Georges et al. | 526/204 |

FOREIGN PATENT DOCUMENTS

| | | | |
|---|---|---|---|
| 465367 | 5/1950 | Canada | 526/234 |
| 579379 | 8/1946 | United Kingdom | 526/234 |
| 608635 | 9/1948 | United Kingdom | 526/234 |

*Primary Examiner*—Joseph L. Schofer
*Assistant Examiner*—N. Sarof
*Attorney, Agent, or Firm*—E. O. Palazzo

[57] ABSTRACT

A free radical polymerization process for the preparation of thermoplastic resin or resins comprising:

heating a mixture of a free radical initiator, a stable free radical agent, and at least one polymerizable monomer compound;

adding under pressure a supercritical fluid, and mixing with sulfur dioxide;

polymerizing said polymerizable monomer to form said thermoplastic resin or resins with a high monomer to polymer conversion;

cooling said mixture;

optionally isolating said thermoplastic resin or resins; and optionally washing and drying said thermoplastic resin, or resins.

24 Claims, No Drawings

POLYMERIZATION PROCESS AND COMPOSITIONS THEREOF

BACKGROUND OF THE INVENTION

The present invention relates to processes for the preparation of polymers, including homopolymers, random copolymers, block copolymers, functionally activated polymers, and the like, and more specifically, to a polymerization process and to the polymers formed thereby. In embodiments, the present invention relates to a stable free radical moderated process for generating a thermoplastic polymer resin or thermoplastic resins with narrow polydispersities, that is, narrow polymer molecular weight distributions as indicated by the ratio $M_w/M_n$, where $M_w$ is the weight average molecular weight and $M_n$ is the number average molecular weight, and easily controllable modality from at least one monomer compound comprising heating for an effective period of time a mixture of a free radical initiator, a stable free radical agent, and at least one polymerizable monomer compound in the presence of carbon dioxide, especially supercritical carbon dioxide modified with sulfur dioxide under conditions such that all polymer chain formations are initiated at about the same time; cooling the mixture to effectively terminate the polymerization; isolating the thermoplastic resin product; and optionally but preferably washing and drying the polymer resin product. With the processes of the present invention in embodiments, the temperature can be, for example, from about 100° C. to about 160° C., about 120° C. to about 140° C., and preferably from about 120° C. to about 130° C. The polymer resins generated by the process of the present invention in embodiments are essentially monomodal, and in embodiments by repeating the heating and carbon dioxide steps, that is, the combined initiation and polymerization step, there is provided a means for obtaining mixtures of monomodal polymer resins that are compositionally the same resin type having characteristics of both narrow polydispersity, and known or selectable modality. In embodiments, the process of the present invention provides a means for conducting bulk or neat free radical polymerization processes on multikilogram or larger scales. The aforementioned embodiments may be accomplished in a one or single pot reactor environment. Further, in embodiments polymeric chain growth proceeds by a pseudoliving mechanism and can provide thermoplastic resins of variable molecular weights from very low to very high, for example less than about 2,000 up to about 300,000, or greater, while maintaining narrow molecular weight distributions or polydispersities of, for example, about 1.05 to about 1.95, and wherein the monomer to polymer conversion is high, for example at least about 50 percent, and more specifically, from about 50 to about 99 to 100 percent. Moreover, in embodiments block copolymers can be synthesized by the aforementioned stable free radical moderated free radical polymerization processes, wherein each block formed is, for example, well defined in length by the reacted monomer, and wherein each block formed possesses a narrow molecular weight distribution, and wherein the block copolymer is substantially 100 percent block copolymer and not contaminated with the formation of homopolymer of the second monomer. The formation of the homopolymer of the second block monomer is a possible competing reaction which occurs in other prior art processes such as in Otsu's iniferter prior art mentioned herein.

One method to prepare polymers or copolymers having a narrow molecular weight distribution or polydispersity is by anionic processes. The use and availability of resins having narrow polydispersities in industrial applications is limited primarily since anionic polymerization processes are performed in the absence of atmospheric oxygen and moisture, require difficult to handle and hazardous initiator reagents, and consequently, such polymerization processes are generally limited to small batch reactors. In addition, the monomers and solvents that are used must be of high purity and anhydrous rendering the anionic process more costly than alternatives which do not have these requirements. It is, therefore, desirable to provide a free radical polymerization process that would provide narrow molecular weight distribution resins without the disadvantages of the aforementioned anionic polymerization processes.

Free radical polymerization processes are chemically less sensitive to impurities in the monomers or solvents typically used, and are completely insensitive to water. There, however, has been a need for an economical free radical polymerization process which is suitable for preparing narrow polydispersity resins by suspension, solution, bulk or neat, emulsion and related processes, and which polymerization process provides resins that can undergo further reaction to provide a number of resins, especially thermoplastic resins.

Copolymers prepared by free radical polymerization processes inherently have broad molecular weight distributions or polydispersities, generally greater than about four. One reason is that free radical initiators have half lives that are relatively long, from several minutes to many hours, and polymeric chains are not all initiated at the same time, and wherein the initiators provide growing chains of various lengths at any time during the polymerization process. Also, the propagating chains in a free radical process can react with each other in processes known as coupling and disproportionation, both of which are chain terminating reactions, thus chains of varying lengths are terminated at different times during the reaction process which results in resins comprised of polymeric chains which vary widely in length from very small to very large. For a free radical polymerization process to be effectively enabled for providing narrow molecular weight distributions, then all polymer chains are to be initiated at about the same time and premature termination by coupling or disproportionation processes must be minimized or avoided.

Otsu et al., in *Makrotool Chem., Rapid Commun.*, 3, 127 (1982), discloses the use of iniferters as a means of producing block copolymers by a free radical polymerization process. A mechanism proposed for the reaction suggested that a pseudoliving propagating free radical chain exists and that it continues to grow with time. There are two primary major drawbacks associated with using iniferters. Iniferters tend to react very slowly and the percent conversion or degree of polymerization of monomer to polymer is low, for example about 40 percent even after 20 hours of reaction time; and the free radical trap that caps the end of the growing chain has the ability to initiate new chains at any time during the course of the reaction, see for example S. R. Turner, R. W. Blevins, in Polymer Reprints, 29(2), September 1988. This initiation results in new chains being initiated at various times during the polymerization and consequently results in a broadening of the polydispersity. The processes of the aforementioned Otsu reference are not believed to be applicable to the synthesis of narrow molecular weight distribution resins, particularly for polymers with high molecular weights.

The use of stable free radicals are known as inhibitors of free radical polymerizations, see for example, G. Moad et al., Polymer Bulletin 6, 589 (1982). Studies by, for example, G. Moad et al. *J. Macromol. Sci.-Chem.*, A17(1), 51(1982) have reported on the use of stable free radicals as inhibitors of free radical polymerizations performed at low temperatures, for example below 90° C. Little is known concerning the reaction of stable free radical agents at higher temperatures and at high monomer to polymer conversions.

In a hypothetical free radical polymerization of styrene in which chains are continually initiated over the course of the polymerization, and where chain termination by coupling processes is also occurring, calculations as described in, for example, G. Odian, Principles of Polymerization, pages 280 to 281, 2nd Ed., John Wiley & Sons, 1981 have shown that the narrowest polydispersity that one can theoretically obtained is 1.5. In practice, polydispersities much greater than 1.5 are actually obtained. Wide polydispersities of between 2.0 and 2.4 are typical for free radical homopolymerizations of styrene. With copolymer systems, polydispersities of greater than 4 are generally obtained. The stable free radical polymerization processes of the instant invention enable narrow polydispersities of between about 1.05 to about 2, and specifically about 1.1 to about 1.3 for polystyrene, and as low as 1.5 for various copolymers like styrene acrylates. Also, the stable free radical polymerization systems of the present invention permit polydispersities that are comparable to those obtained in anionic polymerizations.

U.S. Pat. No. 4,581,429 discloses a free radical polymerization process which controls the growth of polymer chains to provide primarily short chain or oligomeric homopolymers and copolymers including block and graft copolymers. The process employs an initiator reaction product having the formula (in part) =N—O—X, where X is a free radical species capable of polymerizing unsaturated monomers. The molecular weights of the polymer products obtained are generally, for example, from about 2,500 to about 7,000 having polydispersities generally of about 1.4 to about 1.8, at low monomer to polymer conversion. The reactions typically have low conversion rates, use relatively low reaction temperatures of less than about 100° C., and use multiple stages. Reference to the working Examples of this patent indicate temperatures of less than 100° C., one $M_w/M_n$ ratio of apparently 1.15 (if the polymerization was allowed to continue similar to the other Examples, it is believed that the polydispersity would probably broaden and be greater than 1.15), and wherein the $M_n$ was 3,200 and the conversion was low, 1.4 to 1.8, and wherein the calculated nonreported conversion rates are low, for example 22 percent or lower. With the aforementioned processes, it is believed that thermoplastic polymers were not obtained. In Example 23, where there was an attempt to increase the degree of polymerization up to n=70, the temperature was increased to 120° C. for 1.5 hours and there resulted a low molecular weight polymer of $M_n$=6,700 and a broad polydispersity of 1.82. In Example 25, there was employed additional heating at 140° C. for 2 hours to increase the degree of polymerization up to 22 which is still low and not in the region for the material to be considered a polymer. No molecular weight data was given in Example 25. Also, in Example 29 the mixture was heated to 120° C. for 0.5 hours and n was only 11.

In U.S. Pat. No. 5,322,912, the disclosure of which is totally incorporated herein by reference, there is illustrated a free radical polymerization process for the preparation of a thermoplastic resin or resins comprising:

heating a mixture of a free radical initiator, a stable free radical agent, and at least one polymerizable monomer compound to form the thermoplastic resin or resins with a high monomer to polymer conversion;

cooling the mixture;

isolating the thermoplastic resin or resins; and washing and drying the thermoplastic resin or resins, and more specifically, a free radical polymerization process for the preparation of a thermoplastic resin or thermoplastic resins comprising:

heating at a temperature of at least 100° C., and in embodiments from about 120° to about 160° C., a mixture of a free radical initiator, a stable free radical agent, and at least one polymerizabte monomer to form the thermoplastic resin or thermoplastic resins with a high monomer to resin or resins conversion of at least about 50 percent and with polydispersity of from about 1.05 to about 1.95; and cooling the mixture.

U.S. Pat. No. 5,059,657 discloses a polymerization process for acrylic monomers by contacting the monomers with a diazotate, cyanate or hyponitrite, and N-chlorosuccinimide, N-bromosuccinimide or a diazonium salt. The polymer produced can initiate further polymerization, including use in block copolymer formation.

U.S. Pat. No. 5,312,871 discloses a radical polymerization process for the preparation of narrow molecular weight distribution polymers which involves polymerizing a vinyl monomer or monomers with an initiator or initiating system comprising an alkyl or aryl metal, a strongly binding monodentate, bidentate or polydentate ligand and a stable oxy free radical. The initiating system of U.S. Pat. No. 5,312,871 is very complex, consisting of three components; an alkyl or aryl metal and a binding ligand (monodentate, bidentate or polydentate material), plus the stable oxy free radical. Examples of the alkyl or aryl metal are triisobutyl aluminum, diisobutyl aluminum hydride, dichloro ethyl aluminum, diethyl zinc, butyl lithium and phenyl magnesium bromide. Examples of the binding ligands are triphenylphosphine, bipyridyl, dimethylglyoxime and porphyrin. Examples of stable oxy free radical are TEMPO and galvinoxyl. The polymerization process is typically performed in a solvent media such as benzene, toluene or hexane at tem peratures in the range of 0° C. to 100° C.

In free radical polymeriz ation reaction processes of the prior art, with the exception of the U.S. Pat. No. 5,322,912, various significant problems exist, for example difficulties in predicting or controlling the polydispersity and modality of the polymers produced. These free radical polymerization processes usually provide polymers with high weight average molecular weights ($M_w$) and low number average molecular weights ($M_n$) resulting in broad polydispersities, or oligomers. Further, bulk or neat free radical polymerization processes of the prior art are prone to generating excessive quantities of heat since the polymerization reaction is exothermic and as the viscosity of the reaction medium increases dissipation of heat becomes more difficult. This is referred to as the Trommsdorff effect as discussed and illustrated in Principles of Polymerization, G. Odian, 2nd Ed., Wiley-Interscience, N.Y., 1981, page 272, the disclosure of which is entirely incorporated herein by reference. Moreover, the exothermic nature of free radical polymerization processes is often a limitation that severely restricts the concentration of reactants or the reactor size upon scale up.

Further, gel body formation in conventional free radical polymerization processes may result in a broad molecular weight distribution and/or difficulties encountered during filtering, drying and manipulating the product resin. These and other disadvantages are avoided, or minimized with the processes of the present invention.

Illustrated in U.S. Pat. No. 5,274,057, the disclosure of which is totally incorporated herein by reference, is that free radical suspension polymerization reactions may also lead to undesirable deposits of polymer on the agitator, baffles, heating coils and reactor walls. In some situations, the suspension coalesces during the reaction producing large deposits of undesirable polymeric gel material which is difficult, expensive and hazardous to remove from the reactor.

Illustrated in U.S. Pat. No. 5,412,047, the disclosure of which is totally incorporated herein by reference, is polymerization process for the preparation of homopolymeric acrylate containing thermoplastic resin or resins comprising:

heating a mixture comprised of a free radical initiator, an oxo nitroxide stable free radical agent, at least one polymerizable acrylate monomer compound, and optionally a solvent to form a homopolymeric acrylate containing thermoplastic resin or resins with a high monomer to polymer conversion and a narrow polydispersity.

Illustrated in copending application U.S. Ser. No. 348,022, the disclosure of which is totally incorporated herein by reference, is a free radical polymerization process for the preparation of a block copolymer thermoplastic resin or resins comprising:

heating a first mixture comprised of a free radical initiator, a stable free radical agent, and at least one polymerizable monomer compound to form a first intermediate product resin;

cooling said first mixture;

isolating said first intermediate product resin;

adding to said first intermediate product resin a second mixture comprised of at least one polymerizable monomer compound, wherein said polymerizable monomer compound of said second mixture is different from said polymerizable monomer compound of said first mixture, to form a combined mixture;

heating said combined mixture to form a third mixture comprised of a block copolymer thermoplastic resin comprised of a first product resin formed from said first intermediate product resin and added said second monomer;

cooling said third mixture;

isolating said block copolymer thermoplastic resin from said third mixture; and optionally washing and drying said block copolymer thermoplastic resin, and wherein said heating is accomplished at a temperature of from about 40° to about 100° C. in the presence of ultrasonic irradiation.

Also mentioned are commonly owned and assigned copending applications U.S. Ser. No. 08/181,134, filed Jan. 4, 1994, now U.S. Pat. No. 5,401,804; U.S. Ser. No. 08/307,192, filed Mar. 25, 1993 now abandoned; continuation-in-part of U.S. Ser. No. 07/976,604, now U.S. Pat. No. 5,322,912 filed Nov. 16, 1992, U.S. Ser. No. 08/214,518, filed Mar. 18, 1994; and U.S. Ser. No. 08/223,418, filed Apr. 4, 1994.

The disclosures of the above mentioned patents, publications, and copending applications are incorporated herein by reference in their entirety.

The thermoplastic resin products of the present invention can be selected for a number of uses, such as toner, developers and more specifically, as toner resins for electrophotographic imaging processes or where monomodal or mixtures of monomodal narrow molecular weight resins or block copolymers with narrow molecular weight distribution within each block component are suitable such as in thermoplastic films and coating technologies.

In copending patent application U.S. Ser. No. 413,752, the disclosure of which is totally incorporated herein by reference, there is illustrated a free radical polymerization process for the preparation of thermoplastic resin or resins comprising:

heating a mixture of a free radical initiator, a stable free radical agent, and at least one polymerizable monomer compound;

adding under pressure a supercritical fluid;

polymerizing said polymerizable monomer to form said thermoplastic resin or resins with a high monomer to polymer conversion;

cooling said mixture;

optionally isolating said thermoplastic resin; and optionally washing and drying said thermoplastic resin.

SUMMARY OF THE INVENTION

Examples of objects of the present invention include:

An object of the present invention is to provide processes and polymers that overcome many of the problems and disadvantages of the aforementioned prior art.

Another object of the present invention is to provide a free radical polymerization reaction system which affords narrow polydispersity homopolymeric or copolymeric thermoplastic resin products, and wherein low temperatures, such as from about 100° C. to about 160° C., and more specifically, from about 115° C. to about 140° C. can be selected, and wherein supercritical carbon dioxide with added sulfur dioxide is selected, and whereby significant increases in the stable free radical polymerization is achieved.

Another object of the present invention is to provide a free radical polymerization reaction system which affords narrow polydispersity homopolymeric or copolymeric thermoplastic resin products wherein the rate of polymerization is increased so that the required time to polymerize the monomer to polymer is diminished.

In another object of the present invention there is provided a free radical polymerization reaction system which may be conducted in the presence or absence of conventional reaction media.

Further, in another object of the present invention there are provided living stable free radical polymerization processes utilizing supercritical components and sulfur dioxide, which sulfur dioxide can extract unreacted monomers from the polymer during the final stages of polymerization and optionally adding a second monomer to obtain a block copolymer free of solvent and residual monomer. Another advantage of the process of the present invention resides in a viscosity reduction of the polymer product as a result of the plasticization of the polymer by the supercritical carbon dioxide that lowers the polymer Tg, and such a viscosity reduction aids in polymer reactivity by rendering the reactive chain end more mobile decreasing the stirrer energy and complexity of stirrer design to mix the high molecular weight polymer. A further advantage of the process of the present invention is that reagents dissolved in a supercritical fluid, such as a monomer in carbon dioxide, exhibit a higher molecular diffusivity than in a conventional liquid solvent, and the higher diffusivity can increase the rate of reaction. Moreover, a further advantage of supercritical carbon dioxide is that it is inert and little or no chain transfer to solvent occurs during a free radical polymerization. An advantage of selecting sulfur dioxide is that it provides rate enhancement of the stable free radical polymerization and is readily removed by pressure reduction on completion of the reaction.

In yet another object of the present invention, coupling or disproportionation termination reactions are prevented by reversibly terminating the propagating free radical chains with a stable free radical agent which serves to moderate the free radical polymerization process.

In another object of the present invention there is provided the acceleration of the dissociation of the free radical peroxide initiator by the addition of promoter compounds which include, for example, tertiary amines, which ensure that all polymeric chains are initiated nearly simultaneously or about the same time, and wherein low temperatures can be selected.

Still another object of the present invention is to prepare thermoplastic resins by single pot processes employing a monomer or monomers, a suitable azo or peroxide free radical initiator, a stable free radical agent, supercritical carbon dioxide, and sulfur, supercritical carbon dioxide, and sulfur dioxide, and wherein the sulfur dioxide improves the rate of reaction.

Another object of the present invention is to prepare resins using polymerization processes wherein the molecular weight of the growing homopolymer or copolymer chains increase over the entire time period of the polymerization reaction, and wherein the percent conversion or degree of polymerization of monomer to polymer with respect to time or number average molecular weight is approximately linear, that is, polymerization processes which occur without the aforementioned Trommsdorff effect.

In objects of the present invention there are provided processes for the preparation of resins with a $M_w/M_n$ ratio of from about 1.05 to about 1.95, about 1.2 to about 1.5, and preferably from about 1.1 to about 1.6 at temperatures of from about 100° C. to about 160° C., and preferably from about 115 to about 160° C., and wherein a high conversion of monomer to polymer is enabled, for example, at least 50 percent and from about 50 to about 100, or 50 to 95 percent.

Additionally, in another object of the present invention there are provided stable free radical polymerization processes for obtaining homopolymers, such as homopolymers of styrene, random copolymers, block copolymers, multiblock copolymers, and the like, such as specifically styrene acrylates, styrene methacrylates, styrene butadienes, and generally A, AA, AB, BA, AAA, ABA, BAB, AABBAB, ABC, homopolymers and copolymers.

These and other objects of the present invention can be accomplished in embodiments by a free radical polymerization process with a mixture containing a supercritical component.

In embodiments, the present invention overcomes the problems and disadvantages of the prior art by forming narrow polydispersity polymeric resins by, for example, a free radical polymerization process comprising heating a mixture of a free radical initiator, a stable free radical agent, and at least one polymerizable monomer compound to form thermoplastic resin or resins with a high monomer to polymer conversion; cooling the mixture; optionally isolating said thermoplastic resin or resins; and optionally washing and drying the thermoplastic resin or resins, and wherein the thermoplastic resin or resins possess a narrow polydispersity, and wherein the process is accomplished in the presence of a mixture of a supercritical fluid such as carbon dioxide and sulfur dioxide.

Supercritical refers, for example, to a dense gas that is maintained above its critical temperature, i.e., is maintained at a temperature above which the gas cannot be liquefied by the application of any amount of pressure. For example, carbon dioxide has a critical temperature of about 31° C. Thus, carbon dioxide maintained at a temperature at or above the critical temperature of about 31° C. cannot be converted into a liquid by increasing the pressure, and is, therefore, referred to as a supercritical fluid.

The present invention relates to processes for the preparation of polymers, and more specifically, to a polymerization process and to the polymer formed thereby. In embodiments, the present invention relates to a stable free radical process for generating a thermoplastic polymer resin or resins that have narrow polydispersities, that is, narrow molecular weight distributions as defined by the ratio $M_w:M_n$, where $M_w$ is weight average molecular weight and $M_n$ is number average molecular weight, and easily controllable modality from at least one monomer compound. The process comprises heating for an effective period of time a mixture of a free radical initiator, a stable free radical agent, and at least one polymerizable monomer compound, such as 1 to about 4 monomers, under conditions such that all polymer chain formations are initiated at about the same time; cooling the mixture to effectively terminate the polymerization; isolating the thermoplastic resin product; and optionally washing and drying the polymer resins, and wherein the aforementioned process is accomplished in the presence of a supercritical medium, such as carbon dioxide which has added thereto sulfur dioxide in various effective amounts, such as for example from about 1 to 20, and in embodiments from about 1 to 10, or from about 1 to 6 weight percent based on the percent of monomer selected. In embodiments of the present invention, bulk polymerization is selected under stable free radical conditions as indicated herein, and wherein the bulk phase is under supercritical conditions, and the polymer phase is swollen with the supercritical fluid. The polymer resins generated by the process of the present invention in embodiments are essentially monomodal and in embodiments by repeating the heating step, that is, the combined initiation and polymerization step, there can be enabled mixtures of monomodal polymer resins that are compositionally the same resin type having characteristics of both narrow polydispersity and known or selectable modality. Embodiments of the present invention are directed to a free radical polymerization process for the preparation of thermoplastic resins comprising heating a first mixture comprised of a free radical initiator, a stable free radical agent, and at least one polymerizable monomer compound to form a first intermediate product resin; optionally cooling the first mixture; adding to the first intermediate product resin a second mixture comprised of a free radical initiator, a stable free radical agent, and at least one polymerizable monomer compound, wherein the polymerizable monomer or monomers of the second mixture is the same as the polymerizable monomer or monomers of the first mixture, and the free radical initiator and the stable free radical agent of the second mixture are the same or different from the free radical initiator and the stable free radical agent of the first mixture to form a combined mixture; heating the combined mixture in the presence of a mixture of supercritical carbon dioxide and sulfur dioxide to form a third mixture comprised of a mixture of thermoplastic resins comprised of a first product resin formed from the first intermediate product resin and added the second monomer or monomers and a second product resin formed from the second monomer or monomers; cooling the third mixture; optionally isolating the mixture of thermoplastic product resins from the third mixture; and optionally washing and drying the mixture of thermoplastic resins; and wherein the first product resin and the second product resin each possess a narrow polydispersity, and the mixture of thermoplastic resins possesses a modality equal to about 1 to about 2. Higher modalities, for example of from about 3 to about 20, may be conveniently achieved if desired by the subsequent addition of effective amounts of fresh, or new mixtures of monomer or monomers, free radical initiator and stable free radical agent prior to a final cooling and isolation step.

In embodiments, the process of the present invention enables bulk or neat free radical polymerization processes on multikilogram or larger scales. The aforementioned embodiments may be accomplished in a one or single pot reactor environment. In another embodiment, polymeric chain growth proceeds by a pseudoliving mechanism and can provide resins of variable molecular weights from very low to very high, for example from less than about 10,000 up to about 300,000, while maintaining narrow molecular weight distributions or polydispersities. In another embodiment, block copolymers can be synthesized by the aforementioned stable free radical moderated free radical polymerization processes wherein each block formed is well defined in length by the reacted monomer, and wherein each block formed possesses a narrow molecular weight distribution.

Further, in embodiments of the present invention there is provided a free radical polymerization process for the preparation of a block copolymer thermoplastic resin or resins comprising heating at a low temperature of about 40° to 100° C., or heating in embodiments from about 100° C. to about 160° C., and in the presence of a mixture of supercritical carbon dioxide and sulfur dioxide, a first mixture comprised of a free radical initiator, a stable free radical agent, and at least one polymerizable monomer compound to form a first intermediate product resin; cooling the first mixture; isolating the first intermediate product resin; adding to the first intermediate product resin a second mixture comprised of at least one (when preparing a block copolymer there is usually added one monomer at a time, followed by polymerization, then the addition of the next monomer; thus the number of steps or times different monomers can be added is numerous but each time only one monomer is added) polymerizable monomer compound, wherein the polymerizable monomer compound of the second mixture is different from the polymerizable monomer compound of the first mixture to form a combined mixture; heating the combined mixture to form a third mixture comprised of a block copolymer thermoplastic resin comprised of a first product resin formed from the first intermediate product resin and added the second monomer; cooling the third mixture; optionally isolating the block copolymer thermoplastic resin from the third mixture; and optionally washing and drying the block copolymer thermoplastic resin; and wherein the block copolymer possesses a narrow polydispersity and a modality equal to 1. The isolation of the intermediate product resin is preferred when highest purity and block integrity or homogeneity is desired, that is, residual unreacted monomer or monomers of the first mixture may subsequently react with and be integrated into the growing polymer chain formed from the second mixture of polymerizable monomer compounds. Thus, in preparing block copolymers by processes of the present invention isolation by, for example, continuous extraction of residual monomer with the supercritical fluid is preferred when high purity is desired or when the degree of polymerization is less than about 70 to 90 percent for a block or multiblock polymerization reaction.

In embodiments of the aforementioned processes, polymer or copolymer resin compositions may be obtained wherein the resin or resins has a weight average molecular weight ($M_w$) of from about 10,000 to about 200,000, a number average molecular weight ($M_n$) of from about 9,000 to about 100,000, and a polydispersity of from about 1.1 to about 2.0, or from about 1.1 to about 1.6.

Although not being desired to be limited by theory, it is believed that when polymerization reaction processes of the instant invention are performed at a temperature at about or above 100° C., the exact temperature depending on the initiator used, all of the polymer chains are expected to be initiated at about the same time. This is believed to be a primary reason for enabling forming polymer chain products having narrow polydispersities.

Propagating chains of the present invention are referred to as "pseudo-living" because the stable free radical agent adds to a propagating chain and the chain is temporarily, but reversibly, terminated. As shown in the following general reaction scheme, the propagating polymer chain fluctuates or is in an equilibrium condition between being temporarily terminated or suspended and being alive or living. As thermal energy is supplied from the reaction system to the bond joining the growing polymeric chain and the stable free radical (●SFR) agent, that is, the adduct in the accompanying scheme where, for example, the stable free radical agent (●SFR) is covalently bound to the propagating chain, for example, a substituted styrene, homolytically cleaves thereby temporarily generating a living chain end radical species, permitting another monomer unit to insert or add to the chain and is again instantaneously, albeit short lived as determined by diffusion control, terminated or protected by the stable free radical agent as a thermally lablie adduct above about 80° C. to 100° C. or latent free radical chain, reference U.S. Pat. No. 5,322,912 the disclosure of which is totally incorporated herein by reference.

More specifically, the polymerization process of the present invention comprises conducting the stable free radical polymerization process described herein in the presence of a supercritical fluid and sulfur dioxide. Accordingly, where bulk polymerization of the selected monomer or monomers occurs, the bulk phase may generally be in the supercritical phase, and the polymer phase may be swollen by the supercritical fluid medium. A benefit of the supercritical fluid, in embodiments, is that the polymer phase, which is swollen by the supercritical fluid, resembles more a low viscosity liquid, rather than a high viscosity polymer. Thus, processing of the polymerization medium, such as stirring and transporting, is much improved, thereby providing a more efficient and cost-effective process. While not desiring to be limited by theory, it is believed that sulfur dioxide may function as a polar rate enhancing agent such as camphorsulfonic acid which may enhance the rate of stable free radical polymerizations. These components like camphorsulfonic acid are not readily soluble in supercritical carbon dioxide, and in addition, these components would remain in the polymer product while sulfur dioxide is removed as a gas with the reduction of pressure following the polymerization. An additional, or perhaps alternative mode of action of sulfur dioxide on the stable free radical polymerization resides in raising the dielectric constant of the reaction medium; the dielectric constant of supercritical carbon dioxide varies with pressure from about 1.0 to 1.5 while the dielectric constant of liquid sulfur dioxide is much higher at about 14.1. Guan et al. in Macromolecules, 1993, 26, 2663 to 2669 demonstrate that the formation of free radicals by the decomposition of azobisisobutyronitrile (AIBN) is retarded by a low dielectric medium and raising the dielectric constant of the solvent increases the rate of free radical formation. Since the stable free radical polymerization process requires the constant formation of free radicals via the reversible capping of the growing polymer chain with a stable free radical, an increase in the dielectric constant of the reaction medium should increase the reaction rate.

In the present invention, any of a variety of supercritical fluids may be used as the processing medium, providing that they permit the reaction as illustrated herein. Examples of suitable supercritical fluids include carbon dioxide, nitrous oxide, low molecular weight alkanes, such as methane, ethane, propane, and butane, mixtures thereof and the like. In the processes of the present invention, carbon dioxide added in a sufficient amount, such as to provide a pressure of from about 1,000 psi to about 6,000 psi, is preferred as the supercritical fluid.

During the polymerization process, it is preferred that the temperature and pressure of the reactor vessel be maintained at such levels so as to preserve the supercritical fluid in its supercritical state. Thus, in embodiments, the pressure in the reactor vessel is preferably maintained at a level of from about 1,000 psi to about 6,000 psi, and more preferably from about 1,500 psi to about 5,000 psi. Even more preferably, the reactor is maintained at a pressure of from about 2,000 psi to about 4,000 psi. Such pressures may vary, of course, depending upon the specific supercritical fluid being used, the reactor equipment, and the polymerization reaction temperatures.

Generally, in embodiments of the present invention, the reactor vessel is heated to the desired reaction temperature prior to pressurization and introduction of the polymerization reagents (such as monomer or monomers, initiator, stable free radical agent, etc.). The preheating of the reactor vessel may be preferred, for example, to prevent dangerous overpressures from occurring as the otherwise-pressurized reactor is heated to the reaction temperatures. Thus, for example, the reactor vessel of the present invention may be heated to the reaction temperatures of from about 60° C. to about 160° C. prior to adding the supercritical fluid to obtain the reactor pressure of from about 1,000 psi to about 6,000 psi. Once the reactor vessel is heated and pressurized to the desired reaction conditions, the polymerization reagents may be introduced to the reactor vessel, and the polymerization commenced. The order of heating the reactor vessel, pressuring the reactor vessel with the supercritical fluid, and introducing the polymerization reagents into the reactor vessel may not be of particular importance. Thus, in embodiments, it may be desirable to add all of the reaction components into the reactor at the same time, seal the reactor, and heat it to reaction conditions. In embodiments, it may be desirable to maintain constant or intermittent stirring of the reaction components within the reactor vessel. Any of the known methods of stirring the reaction components may be utilized.

During the reaction of monomer or mixed monomers to form polymers, the reaction time may be varied over from about 1 to about 60 hours, preferably between from about 2 to about 20 hours, and optimaily from about 4 to about 15 hours. The optimal reaction time may vary depending upon the temperature, the volume and scale of the reaction, and the quantity and type of polymerization initiator and stable free radical agent selected.

The polymerization reaction temperature is retained relatively constant throughout the heating step by providing an adjustable external heat source. The temperature is maintained at from about 60° C. to about 160° C., preferably between about 100° C. and about 150° C., and optimally in embodiments from about 115° C. to about 140° C. Reactions performed above about 160° C. tend to result in a broadening of the polydispersity. A reaction volume may be selected for any size that enables simple adding, mixing, reacting and isolating the product resins on an economic or convenient scale.

With the process of the present invention, polymer product polydispersities are narrow, and can be varied from between approximately 1.05 to approximately 1.95, or from about 1.1 to about 1.6 depending on the monomer/comonomer system by varying the ratio of stable free radical agent to free radical initiator molar concentration. When the polymerization process conditions of the present invention are attempted without using the SFR additive, broad molecular weight resins with a polydispersity of between 2 and 6 are obtained.

During the reaction of monomer or mixed monomers to form polymers, the reaction time may vary, for example about 1 to about 60 hours, preferably between about 7 to 20 hours, and optimally about 12 to 15 hours. The optimal reaction time may vary depending upon the temperature, the volume and scale of the reaction, and the quantity and type of polymerization initiator and stable free radical agent selected. The polymerization reaction temperature is retained relatively constant throughout the heating step by providing an adjustable external heat source, and which temperature is from about 100° C. to about 150° C., and preferably between about 115° C. and about 140° C.

The free radical initiator selected can be any free radical polymerization initiator capable of initiating a free radical polymerization process and includes peroxide initiators, such as benzoyl peroxide, and azo initiators, such as azobisisobutyronitrile, and the like with benzoyl peroxide being preferred. The initiator concentration employed is about 0.2 to 6 weight percent of the total weight of monomer to be polymerized and is determined by the desired molecular weight of the resin. As the initiator concentration is decreased relative to the weight of molar equivalents of monomer used, the molecular weight of the thermoplastic resin product increases. This free radical initiator is added as a separate component to the reaction mixture and is not reacted with the stable free radical agent prior to use thereof in the processes illustrated herein.

Examples of stable free radical agents, or components that can be selected include nitroxide free radicals like, for example, proxyl (2,2,5,5-tetramethyl- 1-pyrrolidinyloxy), 3-carboxyl-proxyl, 3-carbamoyl-proxyl, 2,2-dimethyl-4,5-cyclohexyl-proxyl, 3-oxo-proxyl, 3-hydroxylimine-proxyl, 3-aminomethyl-proxyl, 3-methoxy-proxyl, 3-t-butyl-proxyl, 3-maleimidoproxyl, 3,4-di-t-butyl-proxyl, 3-carboxylic-2,2,5,5-tetramethyl-1-pyrrolidinyloxy and the like, and derivatives thereof; and TEMPO (2,2,6,6-tetramethyl- 1-piperidinyloxy), 4-benzoxyloxy-TEMPO, 4-methoxy-TEMPO, 4-carboxylic-4-amino-TEMPO, 4-chloro-TEMPO, 4-hydroxylimine-TEMPO, 4-hydroxy-TEMPO, 4-oxo-TEMPO, 4-oxo-TEMPO-ethylene ketal, 4-amino-TEMPO, 2,2,6,6-tetraethyl-1-piperidinyloxy, 2,2,6-trimethyl-6-ethyl-1-piperidinyloxy and the like, and derivatives thereof; and dialkyl nitroxide radicals such as di-t-butyl nitroxide, diphenyl nitroxide, t-butyl-t-amyl nitroxide and the like, and derivatives thereof; and DOXYL (4,4-dimethyl-1-oxazolidinyloxy), 2-di-t-butyl-doxyl, 5-decane-doxyl, 2-cyclohexane-doxyl, and the like, and derivatives thereof; and 2,5-dimethyl-3,4-dicarboxylic-pyrrole, 2,5-dimethyl-3,4- diethylester-pyrrole, 2,3,4,5-tetraphenyl-pyrrole and the like; and 3-cyano-pyrroline-3-carbamoyl-pyrroline, 3-carboxylic-pyrroline and the like; 1,1,3,3-tetramethylisoindolin-2-yloxyl and 1,1,3,3-tetraethylisoindolin- 2-yloxyl and the like; porphyrexide nitroxyl radicals such as 5-cyclohexyl porphyrexide nitroxyl and 2,2,4,5,5-pentamethyl-Δ3-imidazoline- 3-oxide-1-oxyl and the like, and galvinoxyl and the like; 1,3,3-trimethyl-2-azabicyclo[2,2,2]octane-5-one-2-oxide and 1-azabicyclo[3,3,1]nonane-2-oxide and the like; and with TEMPO being preferred. These stable free radical agent materials are known in the literature, for example G. Moad et al., Tetrahedron Letters, 22, 1165 (1981) as free radical polymerization inhibitors. However, under the polymerization conditions of the present invention the stable free radical agents function primarily as moderators to harness the normally highly reactive and indiscriminate intermediate free radical species. Nitroxides include N,N-disubstituted nitroxides such as Fremy's salt.

The molar ratio of the stable free radical (SFR) agent to free radical initiator (INIT) is from about 2.5 to 0.5, and preferably in the range from about 2.0 to 0.9. Although not desired to be limited by theory, in embodiments, the molar ratio [SFR:INIT] of stable free radical agent, for example TEMPO, to free radical initiator, for example benzoyl peroxide, of about 1.3 to 1 is believed to be important. In embodiments, when the [SFR:INIT] is too high then the reaction rate can be decreased. When the [SFR:INIT] is too low, then the reaction product may have undesired increased polydispersity. Also, when styrene is polymerized to polystyrene without the stable free radical agent of the instant process the product polymers isolated have polydispersities of 2.0 and above.

In embodiments, the molar ratio of monomer content to stable free radical agent to free radical initiator is from about 10:0.5:1 to about 10,000:5:1 and preferably in the range of about 300:1.3:1 to about 7,000: 1.3:1. Of importance in embodiments, especially with regard to the polymerizaton of styrene, is a molar ratio of stable free radical to initiator of from about 1.3 to about 1. For monomers other than styrenes, such as acrylates, similar ratios are selected, that is 1.3:1.

Processes of the present invention in embodiments provide for high monomer to polymer conversion rates, or degrees of polymerization, for example of 90 percent by weight or greater and, more specifically, from about 75 to about 100 percent in embodiments. Further, the processes of the present invention in embodiments provide for relatively high weight average molecular weights of the polymer product, from weight average molecular weights ranging from about 2,000 to about 300,000, and preferred ranges of from about 2,000 to about 250,000. In embodiments, with the process of the present invention polymers with $M_w$ of about 500,000 can be obtained.

The monomers selected include those capable of undergoing a free radical polymerization, and include, but are not limited to styrene, substituted styrenes and derivatives thereof, for example α-methylstyrene, 4-methylstyrene, butadiene and any conjugated diene monomer sufficiently reactive under the specified stable free radical moderated polymerization reaction conditions to afford a stable free radical reaction adduct and high molecular weight polymer product, for example isoprene and myrcene, acrylates, and derivatives thereof. Examples of polymers obtained include styrenes, acrylates, styrene acrylates, styrene butadienes, and the like. At least one monomer includes from 1 to about 4 monomers, and more specifically, at least one monomer refers to a single monomer.

The stable free radical moderated polymerization process of the present invention may be repeated a number of times within the same reaction vessel by the delayed and stepwise addition of more monomer or monomers with varying amounts of initiator and stable free radical agent to form a mixture of monomodal resins where each component has a distinct molecular weight and has a narrow molecular weight distribution, and wherein the mixture has a modality of N+1, where N represents the number of additional times that monomer, initiator and stable free radical agent are added.

By cooling, which can be accomplished by terminating the heating source, such as an oil bath, and removing the vessel from the oil bath and permitting it to cool on its own while maintaining stirring, the polymerization reaction attains ambient temperature and the stable free radical moderated reaction is effectively quenched or terminated. Each new or subsequent addition of monomer, stable free radical and initiator accompanied by heating with ultrasound provides a new polymeric species having a narrow molecular weight distribution, and each new polymer species continues to grow independent of the other polymer species previously formed.

Alternatively, block copolymer resins may also be prepared whereby after each desired block has been formed a new monomer or monomers is added without the addition of more initiator or stable free radical agent to form a new block wherein each block component is well defined in length and has a narrow molecular weight distribution, and having properties depending on the repeated sequence and the monomers chosen for incorporation.

Additional optional known additives may be selected in the polymerization reactions, and which may provide additional performance enhancements to the resulting product, for example colorants, lubricants, release or transfer agents, surfactants, stabilizers, antifoams, and the like.

Polymer resins possessing a discrete mixture of monomodal, that is a well defined multimodal molecular weight distribution, may in embodiments thereof provide several advantages, particularly for electrophotographic toner compositions, such as melt rheology properties including improved flow and elasticity; and improved performance properties such as triboelectrification, admix rates and shelf life stabilities.

The processes of the present invention can be selected to form a wide variety of polymers. For example, it can be used to polymerize a styrene monomer to form polystyrene, butadiene to form polybutadiene, or n-butyl acrylate to form poly(n-butyl acrylate). The process of the present invention can be selected to polymerize a mixture of two or more different polymerizable monomers to form copolymers therefrom, for example polymerization of styrene and butadiene to form poly(styrenebutadiene), styrene and isoprene to form poly(styrene-isoprene), styrene and ethyl acrylate to form poly(styrene-ethylacrylate), and the like, and combinations thereof, including copolymers and terpolymers.

A suitable reaction medium employed for conducting processes of the instant invention includes bulk or neat, suspension, emulsion, and solution systems.

In embodiments, there can be incorporated into the monomer a waxy component, such as alkylenes like polyethylene, polypropylene waxes, and mixtures thereof, having a low molecular weight of from between about 1,000 to about 20,000. The use of such a component may be desirable for certain toner applications. Suitable low molecular weight waxes, such as polyethylene and polypropylene, are disclosed in U.S. Pat. No. 4,659,641, the disclosure of which is totally incorporated herein by reference.

Toner compositions can be prepared by a number of known methods, such as admixing and heating resin particles obtained with the processes of the instant invention, such as styrene butadiene copolymers, pigment particles, such as magnetite, carbon black, or mixtures thereof, and cyan, yellow, magenta, green, brown, red, or mixtures thereof, and preferably from about 0.5 percent to about 5 percent of charge enhancing additives in a toner extrusion device, such as the ZSK53 available from Werner Pfleiderer, and removing the formed toner composition from the device. Subsequent to cooling, the toner composition is subjected to grinding utilizing, for example, a Sturtevant micronizer for the purpose of achieving toner particles with a volume median diameter of less than about 25 microns, and preferably of from about 6 to about 12 microns, which diameters are determined by a Coulter Counter. Thereafter, the toner compositions can be classified utilizing, for example, a Donaldson Model B classifier for the purpose of removing toner fines, that is toner particles less than about 4 microns volume median diameter.

Illustrative examples of suitable toner resins obtained with the processes of the present invention that can be selected for toner and developer compositions include styrene acrylates, styrene butadienes, vinyl resins, including homopolymers and copolymers of two or more vinyl monomers; vinyl monomers including styrene, p-chlorostyrene, butadiene, isoprene, and mycene; vinyl esters like esters of monocarboxylic acids including methyl acrylate, ethyl acrylate, n-butyl acrylate, isobutyl acrylate, dodecyl acrylate, 2-ethylhexyl acrylate, n-octyl acrylate, phenyl acrylate, acrylonitrile, methacrylonitrile, acrylamide, and the like. Preferred toner resins include styrene butadiene copolymers, mixtures thereof, and the like. Other preferred toner resins include styrene/acrylate copolymers, PLIOLITES®, and suspension polymerized styrene butadienes, reference U.S. Pat. No. 4,558,108, the disclosure of which is totally incorporated herein by reference.

In toner compositions, the resin particles are present in a sufficient but effective amount, for example from about 60 to about 90 weight percent. Thus, when 1 percent by weight of a charge enhancing additive is present, and 8 percent by weight of pigment or colorant, such as carbon black, is contained therein, about 91 percent by weight of resin is selected. Also, the charge enhancing additive may be coated on the pigment particle. When used as a coating, the charge enhancing additive is present in an amount of from about 0.1 weight percent to about 5 weight percent, and preferably from about 0.3 weight percent to about 1 weight percent.

Numerous well known suitable pigments or dyes can be selected as the colorant for the toner particles including, for example, various carbon blacks like those available from Cabot Corporation like REGAL 330®, nigrosine dye, aniline blue, magnetite, or mixtures thereof. The pigment, which is preferably carbon black, should be present in a sufficient amount to render the toner composition highly colored. Generally, the pigment particles are present in amounts of from about 1 percent by weight to about 20 percent by weight, and preferably from about 2 to about 10 weight percent based on the total weight of the toner composition; however, lesser or greater amounts of pigment particles can be selected.

When the pigment particles are comprised of magnetites, thereby enabling single component toners in some instances, which magnetites are a mixture of iron oxides ($FeO \cdot Fe_2O_3$) including those commercially available as MAPICO BLACK®, they are present in the toner composition in an amount of from about 10 percent by weight to about 70 percent by weight, and preferably in an amount of from about 10 percent by weight to about 50 percent by weight. Mixtures of carbon black and magnetite with from about 1 to about 15 weight percent of carbon black, and preferably from about 2 to about 6 weight percent of carbon black, and magnetite, such as MAPICO BLACK®, in an amount of, for example, from about 5 to about 60, and preferably from about 10 to about 50 weight percent can be selected.

There can also be blended with the toner compositions of the present invention external additive particles including flow aid additives, which additives are usually present on the surface thereof. Examples of these additives include fumed silicas, such as AEROSIL®, metal salts and metal salts of fatty acids inclusive of zinc stearate, aluminum oxides, cerium oxides, and mixtures thereof, which additives are generally present in an amount of from about 0.1 percent by weight to about 5 percent by weight, and preferably in an amount of from about 0.1 percent by weight to about 1 percent by weight. Several of the aforementioned additives are illustrated in U.S. Pat. Nos. 3,590,000 and 3,800,588, the disclosures of which are totally incorporated herein by reference.

With further respect to the present invention, fumed silicas, such as AEROSIL®, can be surface treated with the charge additives in an amount of from about 1 to about 30 weight percent and preferably 10 weight percent, followed by the addition thereof to the toner in an amount of from 0.1 to 10 and preferably 0.1 to 1 weight percent.

Also, there can be included in the toner compositions low molecular weight waxes, that is those with a molecular weight of from about 500 to about 20,000, such as polypropylenes and polyethylenes commercially available from Allied Chemical and Petrolite Corporation, EPOLENE N-15® commercially available from Eastman Chemical Products, Inc., VISCOL 550-P®, a low weight average molecular weight polypropylene available from Sanyo Kasei K.K., and similar materials. The commercially available polyethylenes selected have a molecular weight of from about 1,000 to about 1,500, while the commercially available polypropylenes utilized for the toner compositions are believed to have a molecular weight of from about 4,000 to about 5,000. Many of the polyethylene and polypropylene compositions useful in the present invention are illustrated in British Patent No. 1,442,835, the disclosure of which is totally incorporated herein by reference.

The low molecular weight wax materials are present in the toner composition or the polymer resin beads of the present invention in various amounts, however, generally these waxes are present in the toner composition in an amount of from about 1 percent by weight to about 15 percent by weight, and preferably in an amount of from about 2 percent by weight to about 10 percent by weight, and may in embodiments function as fuser roll release agents.

Included within the scope of the present invention in embodiments are colored toner and developer compositions comprised of toner resin particles, carrier particles, the charge enhancing additives illustrated herein, and as pigments or colorants red, blue, green, brown, magenta, cyan and/or yellow particles, as well as mixtures thereof. More specifically, with regard to the generation of color images utilizing a developer composition with charge enhancing additives, illustrative examples of magenta materials that may be selected as pigments include, for example, 2,9- odimethyl-substituted quinacridone and anthraquinone dye identified in the Color Index as CI 60710, CI Dispersed Red 15, diazo dye identified in the Color Index as CI 26050, CI Solvent Red 19, and the like. Illustrative examples of cyan materials that may be used as pigments include copper tetra-4-(octadecyl sulfonamido) phthalocyanine, X-copper phthalocyanine pigment listed in the Color Index as CI 74160, CI Pigment Blue, and Anthrathrene Blue, identified in the Color Index as CI 69810, Special Blue X-2137, and the like; while illustrative examples of yellow pigments that may be selected are diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33, 2,5-dimethoxy-4-sulfonanilide phenylazo-4'-chloro-2,5-dimethoxy acetoacetanilide, and Permanent Yellow FGL. The aforementioned pigments are incorporated into the toner composition in various suitable effective amounts providing the objectives of the present invention are achieved. In one embodiment, these colored pigment particles are present in the toner composition in an amount of from about 2 percent by weight to about 15 percent by weight calculated on the weight of the toner resin particles.

For the formulation of developer compositions, there are mixed with the toner particles carrier components, particularly those that are capable of triboelectrically assuming an opposite polarity to that of the toner composition. Accordingly, the carrier particles are selected to be of a negative polarity enabling the toner particles, which are positively charged, to adhere to and surround the carrier particles. Illustrative examples of carrier particles include iron powder, steel, nickel, iron, ferrites including copper zinc ferrites, and the like. Additionally, there can be selected as carrier particles nickel berry carriers as illustrated in U.S. Pat. No. 3,847,604, the disclosure of which is totally incorporated herein by reference. The selected carrier particles can be used with or without a coating, the coating generally containing terpolymers of styrene, methyimethacrylate, and a silane, reference U.S. Pat. No. 3,526,533, U.S. Pat. No. 4,937,166, and U.S. Pat. No. 4,935,326, the disclosures of which are totally incorporated herein by reference, including for example KYNAR® and polymethylmethacrylate mixtures (40/60). Coating weights can vary as indicated herein; generally, however, from about 0.3 to about 2, and preferably from about 0.5 to about 1.5 weight percent coating weight is selected.

Furthermore, the diameter of the carrier particles, preferably spherical in shape, is generally from about 50 microns to about 1,000 microns, and in embodiments about 70 to about 175 microns thereby permitting them to possess sufficient density and inertia to avoid adherence to the electrostatic images during the development process. The carrier component can be mixed with the toner composition in various suitable combinations, however, best results are obtained when about 1 to about 5 parts per toner to about 10 parts to about 200 parts by weight of carrier are selected.

The toner composition of the present invention can be prepared by a number of known methods as indicated herein including extrusion melt blending the toner resin particles obtained with the processes of the present invention, pigment particles or colorants, and a charge enhancing additive, followed by mechanical attrition. Other methods include those well known in the art such as spray drying, melt dispersion, and extrusion processing. Also, as indicated herein the toner composition without the charge enhancing additive in the bulk toner can be prepared, followed by the addition of charge additive surface treated silicas.

The toner and developer compositions may be selected for use in electrostatographic imaging apparatuses containing therein conventional photoreceptors providing that they are capable of being charged positively or negatively. Thus, the toner and developer compositions can be used with layered photoreceptors that are capable of being charged negatively, such as those described in U.S. Pat. No. 4,265,990, the disclosure of which is totally incorporated herein by reference. Illustrative examples of inorganic photoreceptors that may be selected for imaging and printing processes include selenium; selenium alloys, such as selenium arsenic, selenium tellurium and the like; halogen doped selenium substances; and halogen doped selenium alloys. Flexible layered imaging members with charge transport and photogenerating layers can be selected for the imaging and printing processes.

The toner compositions are usually jetted and classified subsequent to preparation to enable toner particles with a preferred average diameter of from about 5 to about 25 microns, and more preferably from about 8 to about 12 microns. Also, the toner compositions preferably possess a triboelectric charge of from about 0.1 to about 2 femtocoulombs per micron as determined by the known charge spectrograph. Admix time for toners is preferably from about 5 seconds to 1 minute, and more specifically, from about 5 to about 15 seconds as determined by the known charge spectograph. These toner compositions with rapid admix characteristics enable, for example, the development of images in electrophotographic imaging apparatuses, which images have substantially no background deposits thereon, even at high toner dispensing rates in some instances, for instance exceeding 20 grams per minute; and further, such toner compositions can be selected for high speed electrophotographic apparatuses, that is those exceeding 70 copies per minute.

Also, the toner compositions prepared from resins of the present invention possess desirable narrow charge distributions, optimal charging triboelectric values, preferably of from 10 to about 50, and more preferably from about 10 to about 35 microcoulombs per gram as determined by the known Faraday Cage methods with from about 0.1 to about 5 weight percent in one embodiment of the charge enhancing additive; and rapid admix charging times as determined in the charge spectrograph of less than 15 seconds, and more preferably in embodiments of from about 1 to about 14 seconds.

Embodiments of the present invention include the selection of supercritical carbon dioxide in an amount to provide a pressure of from about 1,000 psi to about 6,000 psi; the selection of sulfur dioxide in an amount of from about 1 to about 20 percent by weight based on the weight of monomer, or monomers selected; heating is for a period of from about 1 to about 60 hours; the stable free radical agent to free radical initiator mole ratio is from about 0.4 to about 2.5; wherein the stable free radical agent to free radical initiator molar ratio is from about 0.9 to about 1.8, or wherein the monomer to free radical initiator molar ratio is from about 100:1 to about 10,000:1; wherein said monomer to polymer conversion is at least 90 percent by weight and said heating is accomplished at a temperature of from about 120° to about 140° C.; and the monomer to polymer conversion is high, for example from about 50 to about 90 percent of monomer or monomers are converted to polymer product.

Embodiments of the present invention include a free radical polymerization process for the preparation of thermoplastic resin or resins comprising:

heating a first mixture comprised of a free radical initiator, a stable free radical agent, and at least one polymerizable monomer compound;

adding under pressure supercritical carbon dioxide followed by the addition of sulfur dioxide;

polymerizing said first polymerizable monomer to form a first intermediate product resin;

extracting unreacted said first polymerizable monomer compound from said first mixture;

optionally cooling said first intermediate product resin;

adding to said first intermediate product resin a second mixture comprised of a free radical initiator, a stable free radical agent, and a second polymerizable monomer compound, wherein said polymerizable monomer compound of said second mixture contains the same components as said polymerizable monomer compound of said first mixture, and said free radical initiator and said stable free radical agent of said second mixture are the same or different from said free radical initiator and said stable free radical agent of said first mixture, and wherein there is formed a combined mixture;

adding sulfur dioxide and adding under pressure supercritical carbon dioxide;

heating said combined mixture to form a third mixture comprised of a mixture of thermoplastic resins comprised of a first product resin formed from said first intermediate product resin and added said second monomer and a second product resin formed from said second monomer;

extracting unreacted said second polymerizable monomer compound from said third mixture;

cooling said third mixture;

optionally isolating said mixture of thermoplastic product resin from said third mixture; and optionally washing and drying said mixture of thermoplastic resins and wherein said first product resin and said second product resin each possess a narrow polydispersity; and a free radical polymerization process for the preparation of thermoplastic resin or resins comprising:

heating a mixture of a free radical initiator, a stable free radical agent, and at least one polymerizable monomer compound;

adding under pressure a supercritical fluid, and mixing with sulfur dioxide;

polymerizing said polymerizable monomer to form said thermoplastic resin or resins with a high monomer to polymer conversion;

cooling said mixture;

optionally isolating said thermoplastic resin or resins; and optionally washing and drying said thermoplastic resin, or resins.

The following Examples are being supplied to further define various species of the present invention, it being noted that these Examples are intended to illustrate and not limit the scope of the present invention. Parts and percentages are by weight unless otherwise indicated. Comparative Examples are also provided.

EXAMPLES

The polymerization reactions of the following Examples were conducted in a stirred 300 milliliter autoclave equipped with a sight glass. The agitator was a helical coil design and was turned at 78 rpm by gear reduction of an electric motor. Heating was provided by a modified Glascol mantle controlled by a Parr temperature controller. The carbon dioxide used was chromatography grade with a helium headspace and was pressurized by a Suprex syringe pump. Monomer addition was made by an Enerpac hand pump. Removal of the $CO_2$ and $SO_2$ was preferably accomplished via a micrometering valve to maintain system back pressure, followed by passing through a separator vessel and coalescing filters to remove any entrained liquids, such as monomers, and then passing through a flow metering device followed by processing in a small water tower for scrubbing the $SO_2$ out of the gas stream.

Example I

The autoclave was prepared and heated to 125° C. and was pressure tested with carbon dioxide. The carbon dioxide was removed by depressurization followed by application of vacuum from a small diaphragm. To the evacuated autoclave was added sulfur dioxide as a gas at the equilibrium tank pressure at room temperature of about 34 psi. Thus, 300 milliliters of $SO_2$ gas were added at 125° C. and about 43 psi. An ideal gas calculation (PV=nRT) estimated the amount of $SO_2$ added by this method to be about 1.8 grams, which was in substantial agreement with a loss of weight measurement of the $SO_2$ supply cylinder using the same $SO_2$ transfer procedure on another occasion with the reactor at 22° C. that showed a transfer of about 2.6 grams, slightly higher since the cooler gas was denser. The autoclave was pressurized with carbon dioxide to a pressure of 3,880 psi. A solution of 0.211 gram of 2,2'-azobis-(2-methylbutyronitrile) and 0.211 gram of TEMPO (2,2,6,6-tetramethyl-1-piperidinyloxy, free radical) in 30 grams of styrene (available from Fluka) was added to the autoclave via the hand pump. The valve connecting the hand pump to the autoclave was then closed, and about 3 or 4 grams of the solution were retained by the inner volume of the pump after addition.

The reaction was maintained at about 125° C. overnight, about 18 to 20 hours, during which time the pressure did not drop. After 18 hours, heating of the autoclave was terminated and the autoclave was slowly cooled as the carbon dioxide was vented off. The autoclave was opened and the polystyrene product was sampled. GPC analysis showed that the polymer polystyrene product has a $M_n$=29,890 and $M_w$=48,899 with a polydispersity of 1.63.

Example II

The process of Example I was repeated except that the polymerization time was about 15 hours. GPC analysis of the polystyrene product showed a $M_n$=24,080 and $M_w$=35,914 with a polydispersity of 1.49. The lower molecular weights obtained with a shorter reaction period were consistent with a living polymerization mechanism.

Example III

The process of Example II was repeated except that the initiator was 2,2'-azobisisobutyronitrile (AIBN) recrystallized twice from methanol and about 0.181 gram was used. GPC analysis of the polystyrene product showed a $M_n$=45,917 and $M_w$=65,640 with a polydispersity of 1.43. TGA analysis of the polymer product indicated about 91 percent conversion.

Example IV

The process of Example III was repeated except that the helical coil agitator stirring at 78 rpm was replaced by two turbine impellors, one situated near the bottom of the reactor and one about two inches from the top. The stirring speed was about 600 rpm. GPC analysis of the polystyrene product showed a $M_n$=61,409 and $M_w$=81,304 with a polydispersity of 1.32.

Example V

The process of Example I was repeated except that the initiator was benzoyl peroxide (BPO) and was used at about the 0.2771 gram level, and the $SO_2$ was added after the initiation step. To primarily avoid the catalytic promotion of BPO by the nitroxide TEMPO, the TEMPO was added in about 10 grams of styrene via the hand pump followed by the BPO in 10 grams of styrene, followed by a final 10 grams of styrene wash to the reactor at 1,280 psi pressure of $CO_2$. After about 40 minutes, the sulfur dioxide, about 2 grams, that had already been added to a second 300 milliliter sample cylinder by the same technique as used in Example I was added to the reactor containing the monomer by a further overpressure of carbon dioxide, first to 1,860 psi, then a second flush to 2,500 psi, and thereafter, the reactor was further pressurized directly by $CO_2$ to 3,810 psi. Heating continued for a further 15 hours after the addition of the $SO_2$. GPC analysis of the polystyrene product showed a $M_n$=46,538 and $M_w$=60,825 with a polydispersity of 1.31.

Example VI

The process of Example I was repeated except that the monomer was 2-ethylhexyl acrylate (30 grams), the initiator was AIBN (0.0691 gram), and the stable free radical was 4-oxo-TEMPO (4-oxo-2,2,6,6-tetramethyl-1-piperidinyloxy, free radical) (0.1187 gram). The reaction temperature was 155° C. and the reaction time was 19 hours. GPC analysis of the polystyrene (2-ethylhexylacrylate) product showed a $M_n$=3,690 and $M_w$=7,699 with a polydispersity of 2.09.

COMPARATIVE EXAMPLE 1

The process of Example II was repeated except that there was no addition of sulfur dioxide. GPC analysis of the polystyrene product showed a $M_n$=1,638 and $M_w$=4,223 with a polydispersity of 2.53.

COMPARATIVE EXAMPLE 2

The process of Example V was repeated except that the addition of sulfur dioxide was carried out before the addition and decomposition of the benzoyl peroxide initiator. GPC analysis of the polystyrene product showed a bimodal peak distribution resulting in a $M_n$=7,983 and $M_w$=44,795 with a polydispersity of 5.61. It was believed that the $SO_2$ was promoting the decomposition of benzoyl peroxide leading to this bimodal molecular weight distribution. Addition of the $SO_2$ after the BPO as in Example V avoids this problem. The azo initiators are not susceptible to such reactions.

Images may be developed in a xerographic imaging test fixture with a negatively charged layered imaging member comprised of a supporting substrate of aluminum, a photogenerating layer of trigonal selenium, and a charge transport layer of the aryl amine N,N'-diphenyl-N,N'-bis(3-methylphenyl)1,1'-biphenyl-4,4'-diamine, 45 weight percent, dispersed in 55 weight percent of the polycarbonate MAKROLON®, as described in U.S. Pat. No. 4,265,990, the disclosure of which is totally incorporated herein by reference. Images with toner compositions prepared from the polymers derived from, for example, Example II were expected to be of excellent quality with no background deposits and of high resolution over an extended number of imaging cycles exceeding, it was believed, about 75,000 imaging cycles.

Toner compositions may be readily prepared by conventional means from the polymer and copolymer resins of the present invention including colored toners, single component toners, multi-component toners, toners containing special performance additives, and the like.

The aforementioned stable free radical agent moderated polymerization process may be applied to a wide range of organic monomers to provide novel toner resin materials with desirable electrophotographic properties. For example, the block copolymers have application as dispersants for photoreceptor pigments. The multimodal resins have application to low melt resins and certain monomodal resins may be used to modify the surface of carbon black and pigment particles to make the pigment particles more miscible with a host polymer or dispersing medium. Narrow molecular weight resins, such as poly(styrene-butadiene), find application as improved toner resins for general application.

Other modifications of the present invention may occur to those skilled in the art based upon a review of the present application and these modifications, including equivalents thereof, are intended to be included within the scope of the present invention.

What is claimed is:

1. A free radical polymerization process for the preparation of thermoplastic resin or resins comprising:

heating a mixture of a free radical initiator, a stable free radical agent, and at least one polymerizable monomer compound;

adding under pressure a supercritical fluid, and mixing with sulfur dioxide;

polymerizing said polymerizable monomer to form said thermoplastic resin or resins with a high monomer to polymer conversion;

cooling said mixture;

optionally isolating said thermoplastic resin or resins; and optionally washing and drying said thermoplastic resin, or resins.

2. A process in accordance with claim 1 wherein the supercritical fluid is added in a sufficient amount to provide a pressure of from about 1,000 psi to about 6,000 psi, one polymerizable monomer is selected, and the sulfur dioxide is added in an amount of from about 1 to about 20 percent by weight of said monomer.

3. A process in accordance with claim 1 wherein the supercritical fluid is selected from the group consisting of carbon dioxide, nitrous oxide and low molecular weight alkanes, and wherein the sulfur dioxide is selected in an amount of from about 1 to about 10 weight percent.

4. A process in accordance with claim 1 wherein the supercritical fluid is carbon dioxide.

5. A process in accordance with claim 2 wherein the heating is for a period of from about 1 to about 60 hours, and the amount of sulfur dioxide is selected from about 1 to about 10 weight percent by weight of the monomer.

6. A process in accordance with claim 1 wherein the thermoplastic resin product has a polydispersity of from about 1.1 to about 2.0.

7. A process in accordance with claim 1 wherein the thermoplastic resin product has a polydispersity of from about 1.1 to about 1.6, and said heating is from about 100° C. to about 150° C.

8. A process in accordance with claim 1 wherein said free radical initiator is selected from the group consisting of organic peroxides, azobisalkylnitriles, peroxycarbonates, and mixtures thereof.

9. A process in accordance with claim 1 wherein the stable free radical agent is comprised of a nitroxide stable free radical.

10. A process in accordance with claim 1 wherein the stable free radical agent is a nitroxide stable free radical selected from the group consisting of 2,2,5,5-tetramethyl-1-pyrrolidinyloxy, derivatives thereof, 2,2,6,6-tetramethyl-1-piperidinyloxy, derivatives thereof, and mixtures thereof.

11. A process in accordance with claim 1 wherein the stable free radical agent to free radical initiator mole ratio is from about 0.4 to about 2.5.

12. A process in accordance with claim 1 wherein the stable free radical agent to free radical initiator molar ratio is from about 0.9 to about 1.8, or wherein the monomer to free radical initiator molar ratio is from about 100:1 to about 10,000:1.

13. A process in accordance with claim 1 wherein said monomer to polymer conversion is at least 90 percent by weight, and said heating is accomplished at a temperature of from about 120° C. to about 140° C.

14. A process in accordance with claim 1 wherein the polymerizable monomer compound is selected from the group consisting of styrene, conjugated dienes, acrylates, and mixtures thereof.

15. A process in accordance with claim 1 wherein said heating is from about 120° C. to about 160° C., and wherein the weight average molecular weight ($M_w$) of the thermoplastic resin is from about 10,000 to about 200,000.

16. A process in accordance with claim 1 further comprising adding a tertiary amine promoter compound to said mixture thereby increasing the rate of dissociation of said free radical initiator, and where said free radical initiator is an organic peroxide.

17. A process in accordance with claim 1 wherein said thermoplastic resin or resins has a polydispersity of from about 1.1 to about 2.0, and the monomer to polymer conversion is from about 50 to about 90 percent.

18. A process in accordance with claim 1 further comprising extracting unreacted said polymerizable monomer compound from said mixture by removing said supercritical fluid and said sulfur dioxide.

19. A process in accordance with claim 1 wherein the free radical initiator and stable free radical agent are added as separate components, and no reaction results between said initiator and said stable free radical agent.

20. A process in accordance with claim 19 wherein the stable free radical agent is comprised of nitroxide stable free radicals selected from the group consisting of 2,2,5,5-tetramethyl-1-pyrrolidinyloxy, 2,2,6,6-tetramethyl-1-piperidinyloxy, 4,4-dimethyl-1-oxazolidinyloxy, N,N-dialkyl nitroxides, di-t-butyl nitroxide, and mixtures thereof.

21. A process in accordance with claim 2 wherein the stable free radical agent is 2,2,6,6-tetramethyl-1-piperidinyloxy and the free radical initiator is benzoyl peroxide.

22. A process in accordance with claim 2 wherein the stable free radical agent is 4-oxo-2,2,6,6-tetramethyl-1-piperidinyloxy, and the free radical initiator is benzoyl peroxide, or azobisisobutyronitrile.

23. A process in accordance with claim 1 wherein the polymerization of the monomer to the resin product occurs without a Trommsdorff effect, or without an autopolymerization effect.

24. A process in accordance with claim 3 wherein cooling is accomplished by heat reduction, the mixture attains a temperature of about 25° C. thereafter, and from one to two monomers are selected.

* * * * *